(12) United States Patent
Lee et al.

(10) Patent No.: US 11,165,728 B2
(45) Date of Patent: Nov. 2, 2021

(54) ELECTRONIC DEVICE AND METHOD FOR DELIVERING MESSAGE BY TO RECIPIENT BASED ON EMOTION OF SENDER

(71) Applicant: Samsung Electronics Co., Ltd., Suwon-si (KR)

(72) Inventors: Im-Sung Lee, Suwon-si (KR); Ki-Won Kim, Suwon-si (KR); Sae Gee Oh, Goyang-si (KR); Ja-Min Goo, Suwon-si (KR); Kiyoung Kwon, Yongin-si (KR); Eun-Young Kim, Seoul (KR); Jimin Kim, Busan (KR); Chulkwi Kim, Yongin-si (KR); Hyung-Woo Kim, Hwaseong-si (KR); Joo Namkung, Gwangju-si (KR); Ji-Hyun Park, Seongnam-si (KR); Seong-Hoon You, Yongin-si (KR); Yong-Ju Yu, Seoul (KR); Dongkyu Lee, Yongin-si (KR); Chanwon Lee, Suwon-si (KR); Si-Hak Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/474,386

(22) PCT Filed: Dec. 21, 2017

(86) PCT No.: PCT/KR2017/015232
§ 371 (c)(1),
(2) Date: Jun. 27, 2019

(87) PCT Pub. No.: WO2018/124633
PCT Pub. Date: Jul. 5, 2018

(65) Prior Publication Data
US 2019/0342243 A1    Nov. 7, 2019

(30) Foreign Application Priority Data

Dec. 27, 2016   (KR) .................... 10-2016-0179774

(51) Int. Cl.
*H04L 12/58* (2006.01)
*G06K 9/00* (2006.01)
(Continued)

(52) U.S. Cl.
CPC .............. *H04L 51/10* (2013.01); *B25J 5/007* (2013.01); *B25J 9/0003* (2013.01);
(Continued)

(58) Field of Classification Search
CPC ..... H04L 51/10; H04L 51/18; G06K 9/00288; G06K 9/00302; G10L 25/63; B25J 9/0003; B25J 9/007; B25J 5/007
(Continued)

(56) References Cited

U.S. PATENT DOCUMENTS 7,720,572 B2 * 5/2010 Ziegler .................. G16H 20/00
                                                 700/245
7,957,837 B2 * 6/2011 Ziegler .................. G16H 20/00
                                                 700/258
(Continued)

FOREIGN PATENT DOCUMENTS

CN       101686442 A  *  3/2010
CN       102780651 A  *  11/2012
(Continued)

OTHER PUBLICATIONS

Mital, Parag K., Tim J. Smith, Robin L. Hill, and John M. Henderson. "Clustering of gaze during dynamic scene viewing is predicted by motion." Cognitive computation 3, No. 1 (2011): 5-24. (Year: 2011).*

(Continued)

*Primary Examiner* — George C Neurauter, Jr.
(74) *Attorney, Agent, or Firm* — Jefferson IP Law, LLP

(57) ABSTRACT

Various embodiments of the present disclosure relate to an electronic device and a method for delivering a message by the same. The electronic device may comprise: a camera; at least one processor functionally connected to the camera; a driving circuitry configured to control moving of the electronic device; and a memory for storing at least one program configured to be executable by the at least one processor, wherein the program comprises instructions that are set to: in response to an input of a message from a sender, activate the camera and capture an image of the sender, analyze the image of the sender for an emotion of the sender, analyze the inputted message for a recipient, determine an output pattern based on the image, determine the recipient based on the inputted message, determine whether the determined recipient is located in a vicinity of the electronic device, and in response to the determined recipient not being located in the vicinity of the electronic device, identify a location of the determined recipient and control the driving circuitry to move the electronic device to the identified location.

20 Claims, 11 Drawing Sheets

(51) Int. Cl.
| | | |
|---|---|---|
| *G10L 25/63* | (2013.01) | |
| *B25J 5/00* | (2006.01) | |
| *B25J 9/00* | (2006.01) | |

(52) U.S. Cl.
CPC ..... *G06K 9/00288* (2013.01); *G06K 9/00302* (2013.01); *G10L 25/63* (2013.01); *H04L 51/18* (2013.01)

(58) Field of Classification Search
USPC .................................................. 709/206, 217
See application file for complete search history.

(56) References Cited

U.S. PATENT DOCUMENTS

| | | | | |
|---|---|---|---|---|
| 8,160,549 B2* | 4/2012 | Bychkov | ............ | H04M 1/72527 455/412.1 |
| 8,195,333 B2* | 6/2012 | Ziegler | ................. | G16H 40/63 700/259 |
| 8,265,793 B2* | 9/2012 | Cross | ...................... | H04L 67/10 700/259 |
| 8,583,282 B2* | 11/2013 | Angle | ................. | G05D 1/0272 700/245 |
| 8,935,006 B2* | 1/2015 | Vu | ......................... | B25J 11/008 700/264 |
| 9,043,196 B1* | 5/2015 | Leydon | ............... | G06F 3/04842 704/4 |
| 9,446,510 B2* | 9/2016 | Vu | ........................... | B25J 19/06 |
| 9,452,525 B2* | 9/2016 | Ziegler | ................. | G16H 20/13 |
| 9,577,963 B2* | 2/2017 | Dowdell | ............... | H04L 51/063 |
| 9,796,078 B2* | 10/2017 | Angle | ................... | G16H 20/13 |
| 9,818,228 B2* | 11/2017 | Lanier | ................... | H04W 12/02 |
| 9,878,445 B2* | 1/2018 | Angle | ................... | B25J 11/008 |
| 9,996,217 B2* | 6/2018 | Kozloski | ............ | G06F 40/186 |
| 10,008,196 B2* | 6/2018 | Maisonnier | .......... | B25J 11/0005 |
| 10,133,918 B1* | 11/2018 | Chang | ................. | G06K 9/00362 |
| 10,168,859 B2* | 1/2019 | Kozloski | ............... | G06F 40/186 |
| 10,191,920 B1* | 1/2019 | Grundmann | ........... | G06T 11/60 |
| 10,305,850 B1* | 5/2019 | Aziz | ................... | G06Q 30/0261 |
| 10,357,881 B2* | 7/2019 | Faridi | ................. | H04N 5/23219 |
| 10,365,788 B2* | 7/2019 | Kozloski | ................. | G06F 40/30 |
| 10,372,293 B2* | 8/2019 | Kozloski | ................. | G06F 40/274 |
| 10,391,636 B2* | 8/2019 | Breazeal | ............ | H04N 5/23206 |
| 10,486,312 B2* | 11/2019 | Yamato | ................ | G06N 3/008 |
| 10,594,638 B2* | 3/2020 | Bostick | ................... | H04L 51/10 |
| 10,596,708 B2* | 3/2020 | Park | ........................ | G06F 3/012 |
| 10,699,104 B2* | 6/2020 | Xu | ........................... | G10L 25/63 |
| 10,706,271 B2* | 7/2020 | Bryant, III | .......... | G06F 3/04817 |
| 10,708,203 B2* | 7/2020 | Morris | ................... | H04L 51/046 |
| 10,776,584 B2* | 9/2020 | Phillips | ................... | H04L 51/04 |
| 2003/0097411 A1 | 5/2003 | Litwin | | |
| 2005/0091684 A1* | 4/2005 | Kawabata | ............... | G10L 15/26 725/35 |
| 2007/0135119 A1 | 6/2007 | Hashimoto et al. | | |
| 2008/0077277 A1* | 3/2008 | Park | ........................ | G06N 3/008 700/245 |
| 2009/0110246 A1* | 4/2009 | Olsson | .............. | H04M 1/72544 382/118 |
| 2010/0057875 A1* | 3/2010 | Bychkov | ........... | H04M 1/72527 709/206 |
| 2010/0086204 A1* | 4/2010 | Lessing | .................... | G06F 16/58 382/165 |
| 2012/0124456 A1* | 5/2012 | Perez | ...................... | G06Q 30/06 715/200 |
| 2012/0233633 A1* | 9/2012 | Nishikawa | ............. | H04H 60/33 725/12 |
| 2012/0280951 A1* | 11/2012 | Bychkov | ................. | H04L 51/38 345/184 |
| 2012/0316676 A1* | 12/2012 | Fouillade | ............... | B25J 9/1697 700/246 |
| 2013/0218339 A1* | 8/2013 | Maisonnier | ........... | B25J 13/003 700/257 |
| 2014/0157153 A1* | 6/2014 | Yuen | ...................... | A63F 13/537 715/758 |
| 2015/0146925 A1 | 5/2015 | Son et al. | | |
| 2015/0206000 A1* | 7/2015 | el Kaliouby | ........... | A61B 5/165 382/118 |
| 2015/0295867 A1* | 10/2015 | Luca | ........................ | H04L 51/10 709/206 |
| 2015/0314454 A1* | 11/2015 | Breazeal | ................ | B25J 9/0003 700/259 |
| 2015/0355468 A1* | 12/2015 | Osterhout | ............... | G06F 3/011 345/633 |
| 2015/0381534 A1* | 12/2015 | Morris | ................ | G06F 3/04817 715/752 |
| 2016/0193732 A1* | 7/2016 | Breazeal | ................ | B25J 9/1694 700/258 |
| 2016/0199977 A1* | 7/2016 | Breazeal | ................ | B25J 9/1694 700/246 |
| 2016/0241500 A1* | 8/2016 | Bostick | ................... | H04L 51/10 |
| 2016/0328015 A1* | 11/2016 | Ha | ...................... | G06K 9/00597 |
| 2017/0024087 A1* | 1/2017 | Pathy | .................... | H04L 67/306 |
| 2017/0364484 A1* | 12/2017 | Hayes | ................... | G06F 40/109 |
| 2018/0027307 A1* | 1/2018 | Ni | ....................... | G06K 9/00315 345/419 |
| 2018/0077095 A1* | 3/2018 | Deyle | ..................... | G10L 25/63 |
| 2018/0133900 A1* | 5/2018 | Breazeal | ................ | B25J 19/026 |
| 2018/0229372 A1* | 8/2018 | Breazeal | ................ | B25J 11/001 |
| 2018/0331989 A1* | 11/2018 | Bastide | ................... | H04L 51/046 |
| 2018/0331990 A1* | 11/2018 | Bastide | ................... | H04L 51/10 |
| 2019/0079922 A1* | 3/2019 | Moskowitz | ............ | G06Q 10/10 |
| 2019/0126157 A1* | 5/2019 | Hayashi | .................. | A63H 3/28 |
| 2019/0190865 A1* | 6/2019 | Jeon | ..................... | G06K 9/00228 |
| 2020/0014644 A1* | 1/2020 | Bastide | ................. | H04L 51/063 |
| 2020/0153772 A1* | 5/2020 | Bostick | ................... | H04L 51/10 |

FOREIGN PATENT DOCUMENTS

| | | |
|---|---|---|
| JP | 2001-016514 A | 1/2001 |
| KR | 10-2009-0105198 A | 10/2009 |
| KR | 10-2014-0106891 A | 9/2014 |
| KR | 10-2015-0059466 A | 6/2015 |
| WO | 2015/158876 A1 | 10/2015 |

OTHER PUBLICATIONS

European Search Report dated Nov. 26, 2019, issued in European Patent Application No. 17887937.5.

* cited by examiner

ELECTRONIC DEVICE AND METHOD FOR DELIVERING MESSAGE BY TO RECIPIENT BASED ON EMOTION OF SENDER

CROSS-REFERENCE TO RELATED APPLICATION(S)

This application is a U.S. National Stage application under 35 U.S.C. § 371 of an International application number PCT/KR2017/015232, filed on Dec. 21, 2017, which is based on and claimed priority of a Korean patent application number 10-2016-0179774, filed on Dec. 27, 2016, in the Korean Intellectual Property Office the disclosure of which is incorporated by reference herein in its entirety.

TECHNICAL FIELD

Various embodiments of the disclosure relate to an electronic device and a method for delivering a message by the same.

BACKGROUND ART

Electronic devices (for example, mobile terminals, smartphones, wearable electronic devices, or the like) may provide various functions. For example, a smartphone may provide an Internet access function, a music or video replay function, a capturing function, a navigation function, a messenger function, etc. in addition to a basic voice communication function.

The messenger function enables messages in a text form to be exchanged with a specific user. However, a recent messenger function does not only exchange a simple text, but also transmits multimedia messages. For example, the electronic devices are able to transmit and receive emoticons, recorded files, photos and/or video files.

DISCLOSURE OF INVENTION

Technical Problem

However, the electronic devices simply transmit a multimedia message including a recorded file, a photo, or a video file to an electronic device of a designated reception side. The electronic device of the reception side may display the received multimedia message on a screen regardless of whether there is a recipient in the vicinity of the electronic device. In addition, since the electronic device simply transmits the multimedia message, the electronic device may not appropriately convey an emotion of a sender to the recipient.

To solve the above-described problems, various embodiments of the disclosure may receive a message that is to be delivered to a specific recipient from a sender, and may deliver the corresponding message to the recipient when the recipient is recognized.

In addition, various embodiments of the disclosure may deliver a message to a recipient by reflecting an emotion state of a sender, an intensity of emotion, age, sex of the sender, and a situation of a recipient (for example, an event such as birthday, anniversary), and/or a preference (for example, a frequently replayed content).

Solution to Problem

According to various embodiments of the disclosure, an electronic devices includes: a camera; at least one processor functionally connected with the camera; and a memory configured to store at least one program configured to be executable by the at least one processor, and the program includes instructions that are set to: in response to an input of a message from a sender being detected, activate the camera and to capture the sender; analyze an image of the captured sender and the inputted message; determine a recipient and an output pattern based on a result of the analysis; identify whether the recipient is recognized; and when the recipient is recognized, deliver the message to the recognized recipient based on the determined output pattern.

According to various embodiments of the disclosure, a method for delivering a message in an electronic device includes: in response to an input of a message from a sender being detected, capturing the sender; analyzing an image of the captured sender and the inputted message; determining a recipient and an output pattern based on a result of analyzing the image of the captured sender and the inputted message; identifying whether the recipient is recognized; and, when the recipient is recognized, delivering the message to the recognized recipient based on the determined output pattern.

Advantageous Effects of Invention

Various embodiments of the disclosure can enhance a message delivering effect by delivering a message by considering an emotion state and an intensity of emotion of a sender. For example, the electronic device may deliver the message to a recipient by displaying a different screen (for example, background screen, expression in the case of a movable robot having a face), or by having a different motion and a different intensity of motion according to the emotion state and/or intensity of emotion of the sender. Alternatively, the electronic device may deliver the message to the recipient by having a different output tone of the message and/or a different background sound according to the emotion state and/or the intensity of emotion of the sender.

Alternatively, the electronic device may output the message by using a machine sound set according to the age of the sender, or may output the message by using a voice of the sender.

In addition, various embodiments of the disclosure can enhance a message delivering effect by delivering a message by considering a situation and a preference of a recipient. For example, the electronic device may output music preferred by the recipient as background music, or may output the message by using a voice preferred by the recipient (for example, a voice of famous people, such as an actor, a singer, a comedian, a voice actor, an athlete, etc. or a voice of a character). Alternatively, when the message is a birthday message, the electronic device may deliver the message to the recipient along with a birthday song.

In addition, various embodiments of the disclosure can recognize a recipient and can deliver a message (for example, a secrete message) only to the corresponding recipient, thereby being able to enhance security.

BEST MODE FOR CARRYING OUT THE INVENTION

Figure 1:
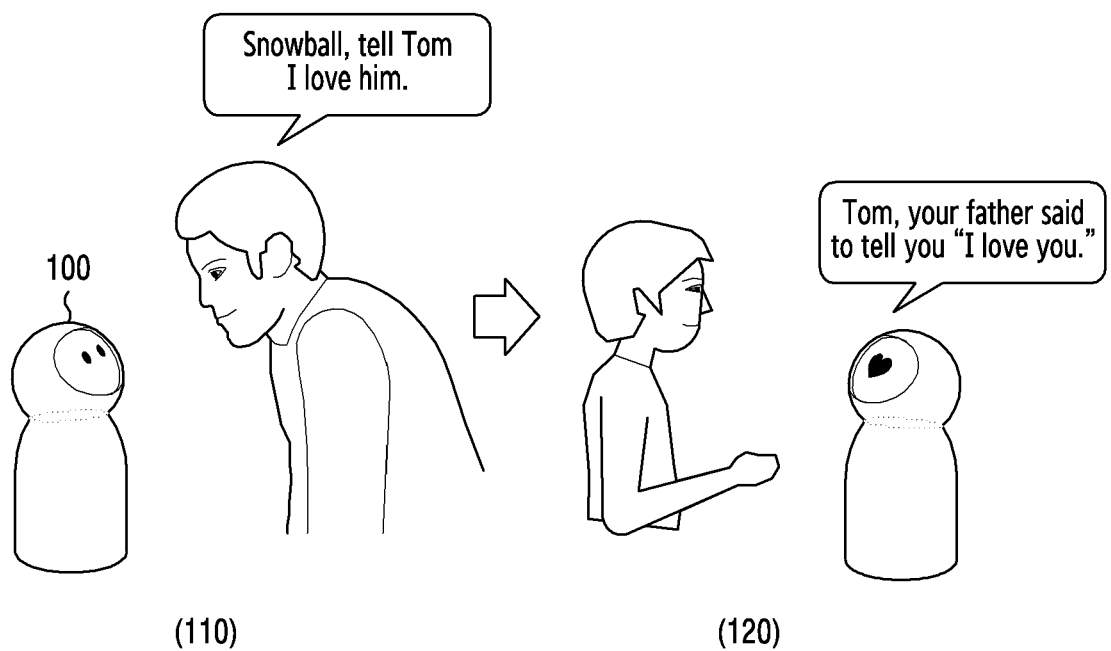
FIG. 1 is a view illustrating an example of delivering a message by using an electronic device according to an embodiment of the disclosure.

Various embodiments of the present disclosure are described in greater detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure. The terms used herein are defined in consideration of functions of the present disclosure and may vary depending on a user's or an operator's intention and usage. Therefore, the terms used herein should be understood based on the descriptions made herein. It is to be understood that the singular forms "a," "an," and "the" also include plural referents unless the context clearly dictates otherwise. In the present disclosure, an expression such as "A or B," "at least one of A and B" or "one or more of A and B" may include all possible combinations of the listed items. Expressions such as "first," "second," "primarily," or "secondary," as used herein, may represent various elements regardless of order and/or importance, and do not limit the corresponding elements. The expressions may be used for distinguishing one element from another element. When it is described that an element (such as a first element) is operatively or communicatively "coupled to" or "connected to" another element (such as a second element), the element may be directly connected to the other element or may be connected through another element (such as a third element).

The expression "configured (or set) to", as used in the present disclosure, may be used interchangeably with, for example, "suitable for," "having the capacity to," "designed to," "adapted to," "made to," or "capable of", according to the situation. The term "configured (or set) to" does not only refer to "specifically designed to" in hardware. Alternatively, in some situations, the expression "apparatus configured to" may refer to a situation in which the apparatus "may" operate together with another apparatus or component. The phrase "a processor configured (or set) to perform A, B, and C" may be a dedicated processor (such as an embedded processor) for performing a corresponding operation, or a general-purpose processor (such as a central processing (CPU) or an application processor (AP)) that may perform a corresponding operation by executing at least one software program stored in a memory device.

An electronic device, according to an embodiment of the present disclosure, may be for example, at least one of a smart phone, a tablet PC, a mobile phone, a video phone, an e-book reader, a desktop PC, a laptop PC, a notebook computer, a workstation, a server, a PDA, a portable multimedia player (PMP), an MPEG 3 (MP3) player, medical equipment, a camera, and a wearable device, and the like, but is not limited thereto. The wearable device may include at least one of an accessory type (e.g., a watch, a ring, a bracelet, an ankle bracelet, a necklace, eyeglasses, a contact lens, or a head-mounted-device (HMD)), a fabric or clothing embedded type (e.g., electronic garments), a body attachable type (e.g., a skin pad or a tattoo), and an implantable circuit, and the like, but is not limited thereto. The electronic device may be at least one of, for example, a television, a digital versatile disc (DVD) player, an audio device, a refrigerator, an air-conditioner, a cleaner, an oven, a microwave oven, a washing machine, an air cleaner, a set-top box, a home automation control panel, a security control panel, a media box (e.g., samsung HomeSync™, apple TV™, google TV™), a game console (Xbox™, PlayStation™), an electronic dictionary, an electronic key, a camcorder, and an electronic frame.

In an embodiment of the present disclosure, the electronic device may be at least one of various medical devices (such as, various portable medical measuring devices (a blood sugar level measuring device, a heartbeat measuring device, a blood pressure measuring device, or a body temperature measuring device), a magnetic resonance angiography (MRA) device, a magnetic resonance imaging (MRI) device, a computed tomography (CT) device, a scanning machine, and an ultrasonic wave device), a navigation device, a global navigation satellite system (GNSS), an event data recorder (EDR), a flight data recorder (FDR), a vehicle infotainment device, electronic equipment for a ship (such as, a navigation device for a ship and a gyro compass), avionics, a security device, a head unit for a vehicle, an industrial or home robot, a drone, an automated teller machine (ATM), a point of sales (POS) device, and an Internet of things (IoT) device (e.g., a light bulb, various sensors, a sprinkler device, a fire alarm, a thermostat, a street light, a toaster, sports equipment, a hot water tank, a heater, and a boiler), and the like, but is not limited thereto. According to an embodiment of the present disclosure, the electronic device may be at least one of a portion of furniture, building/construction or vehicle, an electronic board, an electronic signature receiving device, a projector, and various measuring devices (e.g., water supply, electricity, gas, or electric wave measuring device), and the like, but is not limited thereto. An electronic device may be a flexible electronic device or a combination of two or more of the foregoing various devices. An electronic device is not limited to the foregoing devices, and may be embodied as a newly developed electronic device. The term "user", as used herein, may refer to a person using an electronic device or a device using an electronic device (e.g., an artificial intelligence electronic device).

Prior to explaining in detail, it is assumed that the electronic device is a snowman-shaped robot. However, various embodiments of the disclosure are not limited thereto. For example, various embodiments of the disclosure can be applied to robots of various shapes (for example, puppy, cat, or the like) or various electronic devices such as Internet of Thing (IoT) devices, smartphones, tablets, or notebooks.

FIG. 1 is a view illustrating an example of delivering a message by using an electronic device according to an embodiment of the disclosure.

Referring to FIG. 1, the electronic device 100 according to an embodiment of the disclosure may receive an input of a message from a first user (hereinafter, a sender), and may deliver the message to a second user (hereinafter, a recipient).

For example, as shown in identification number 110 of FIG. 1, the electronic device 100 may receive an input of a voice message of the sender, "Snowball, tell Tom I love him," by using a microphone (not shown).

When a designated word (for example, a snowball) is detected from the inputted message, the electronic device 100 may recognize the message as a message delivering command and may activate a message delivering function. According to a certain embodiment, the electronic device 100 may receive the input of the voice message of the sender after the message delivering function is activated in response to a set gesture input, a set menu input. In this case, the electronic device 100 may visually or acoustically notify a user that the message delivering function is activated. When the message delivering function is activated, the electronic device 100 may capture the face of the sender through a camera (not shown).

The electronic device 100 may perform an analysis operation while the message is inputted and/or after the input of the message is completed. The analysis operation may include user analysis, voice analysis, vision analysis, situation analysis, and/or preference analysis.

The electronic device 100 may recognize sender and recipient information through the user analysis. For example, the electronic device 100 may recognize the sender through face recognition and/or speaker recognition. The electronic device 100 may convert a voice message into a text and then may recognize recipient information through syntactic analysis. For example, the electronic device 100 may extract a word corresponding to information (for example, a name, a nickname, etc.) registered at an address book from the converted text, and may recognize the recipient. Alternatively, the electronic device 100 may recognize a word positioned after a designated word (for example, "to") as the recipient. For example, in identification number 110, the electronic device 100 may recognize the word "Tom" positioned after the designated word "to" as the recipient. According to a certain embodiment, the electronic device 100 may receive an input of recipient information through an input device (for example, a touch screen).

The electronic device 100 may identify sex, age of the sender and the recipient and/or a relationship between the sender and the recipient (for example, father and son) by using pre-stored profile information. According to a certain embodiment, the electronic device 100 may recognize the sex and/or age of the sender through voice analysis and/or vision analysis.

The electronic device 100 may recognize an emotion state and/or an intensity of emotion of the sender through voice analysis and/or vision analysis. For example, the electronic device 100 may convert the inputted voice into a text, and may extract a word (for example, love, worry, depression, boredom, sadness, etc.) related to emotions from the text. The electronic device 100 may recognize the emotion state and/or the intensity of emotion through a facial expression of the sender detected through vision analysis. For example, the electronic device 100 may recognize the emotion state through the shape of eyes and/or mouth, and may recognize the intensity of emotion by using a predetermined parameter related to a raising angle of the corner of mouth and/or the outer corner of the eye.

The electronic device 100 may perform situation analysis. For example, the electronic device 100 may identify information of an event (for example, birthday, anniversary, etc.) related to the recipient by using pre-stored schedule information. Alternatively, the electronic device 100 may extract a word (for example, birthday, wedding, etc.) related to an event (for example, birthday, anniversary, etc.) from the converted text.

The electronic device 100 may perform preference analysis. For example, the electronic device 100 may identify information of a content that is frequently reproduced by the recipient recently (preference content) (for example, music, movie, animation, etc.). According to a certain embodiment, the electronic device 100 may periodically receive information regarding preference contents from at least one other electronic device (a smartphone, a tablet, a wearable electronic device, etc.) (not shown) owned by the recipient.

According to a certain embodiment, the electronic device 100 may identify whether the message is required to be kept secret (hereinafter, a secret message). For example, when a specific word (for example, secretly, secret, security, etc.) is detected, the electronic device 100 may recognize that the message is a secret message and may store the message. Alternatively, when a predetermined specific gesture or menu is inputted after the input of the message is completed, the electronic device 100 may recognize the secrete message and may store the message. Alternatively, when the message delivering function is activated through a gesture or a menu indicating the secret message, the electronic device 100 may recognize the secrete message and store the message.

When the above-described analysis operations are completed, the electronic device 100 may determine an output pattern for delivering the message based on the result of the analysis. The output pattern may be a face expression of the robot-shaped electronic device 100, a motion, an auditory user interface (AUI) (for example, a sound effect, a background music, etc.), a voice type (for example, male, female, kid, adult, animation character, etc.) For example, when the emotion of the sender is joy and the sender is the father of the recipient, the electronic device 100 may determine a smiling face as the face expression, determine a smiling action as the motion, determine a laughing sound as the AUI, and determine a voice of an adult man (or voice of father) as the voice type. The output pattern may vary according to an intensity of emotion of the sender. For example, the electronic device 100 may determine one of a plurality of smiling expressions, one of a plurality of smiling actions, and one of a plurality of laughing sounds according to the intensity of joy of the sender. For example, as the intensity of emotion increases, the electronic device 100 may increase the size of the motion, the time of the motion, and the output size of the sound, and may make a change in the expression bigger.

The electronic device 100 may recognize the recipient. For example, the electronic device 100 may identify the recipient through face recognition when a subject (person) is detected through the camera. In another embodiment, the electronic device 100 may detect a sound of a predetermined level or higher corresponding a voice of a person in the vicinity through the microphone, and may identify the recipient through speaker recognition. In still another embodiment, the electronic device 100 may recognize that the recipient is located in the vicinity when the electronic device 100 is connected with an electronic device (for example, a wearable electronic device) of the recipient through short range wireless communication.

According to a certain embodiment, when the electronic device 100 is a movable robot used in a home, the electronic device 100 may request the location of the recipient from various electronic devices (for example, IoT devices) belonging to a home network, and may receive the location of the recipient from the various electronic devices and may move to the corresponding location.

When the recipient is recognized, the electronic device 100 may output the message according to the determined output pattern. For example, as shown in identification number 120, when "Tom" is recognized, the electronic device 100 may have a smiling expression and perform a smiling action, and also, may output a laughing sound as a sound effect and may output the message "I love you" by using a voice of an adult man. In another embodiment, the electronic device 100 may output the message "I love you" by using a voice of a character of animation instead of the voice of the adult man (or father), by reflecting the preference of the recipient (son).

According to a certain embodiment, the electronic device 100 may track recipient's pupil after recognizing the recipient, and, when it is recognized that the recipient's pupil gazes at the electronic device 100, the electronic device 100 may output the message according to the output pattern.

According to a certain embodiment, when the message is a secret message, the electronic device 100 may identify whether there are other people in the vicinity in recognizing the recipient, and, when there are no other people, the electronic device 100 may deliver the secret message. According to a certain embodiment, the electronic device 100 may notify the recipient that the secret message is received, and may deliver the secret message after authenticating the recipient (for example, password input, biometric (for example, fingerprint, iris, etc.) authentication, or the like).

According to a certain embodiment, the electronic device 100 may perform at least part of the analysis operations (for example, analysis of an emotion state and/or an intensity of emotion) through an emotion analysis server (not shown). For example, the electronic device 100 may transmit the inputted voice and/or the captured image to the emotion analysis server (not shown), and may receive the result of analysis from the emotion analysis server (not shown). The emotion analysis server (not shown) may continuously collect data from a plurality of electronic devices, and may update a database for emotion analysis. As described above, the emotion analysis server analyzes the emotion state and/or intensity of emotion based on big data, such that the accuracy of analysis can be enhanced.

Figure 2:
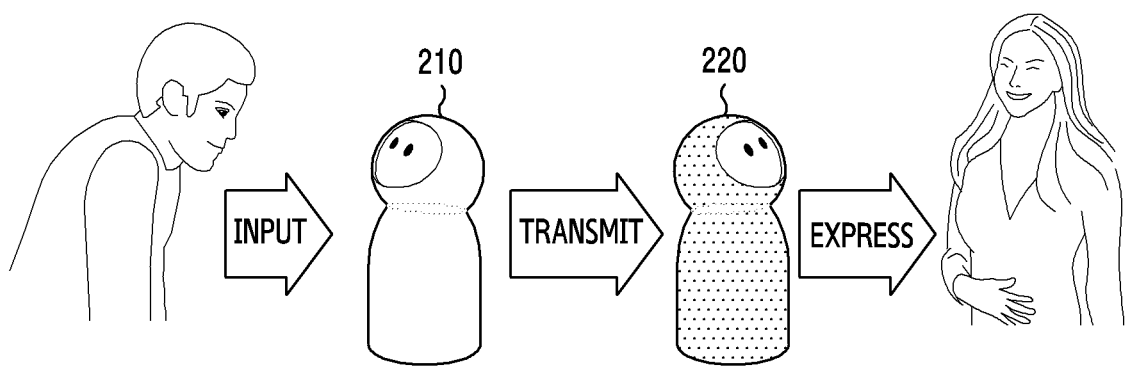
FIG. 2 is a view illustrating an example of delivering a message according to an embodiment of the disclosure.

FIG. 2 is a view illustrating an example of delivering a message according to an embodiment of the disclosure.

Referring to FIG. 2, a first electronic device 210 according to an embodiment of the disclosure may receive an input of a message from a sender and may perform an analysis operation. When the analysis operation is completed, the first electronic device 210 may identify a second electronic device 220 owned by a recipient, and may transmit an output pattern generated according to the analysis operation to the identified second electronic device 220.

The first electronic device 210 may connect a communication channel with the second electronic device 220 through short range wireless communication (for example, Bluetooth, WiFi, home RF, etc.) or long range wireless communication (Internet network, mobile communication network, etc.). The first electronic device 210 may separately connect a communication channel for normal communication (for example, text message exchange, voice or video call, etc.), and a communication channel for delivering a message including the emotion information.

The second electronic device 220 which receives the output pattern may recognize the recipient, and, when the recipient is recognized, may deliver the message according to the transmitted output pattern.

According to a certain embodiment, the analysis operations may be divided and separately performed by the first electronic device 210 and the second electronic device 220. For example, the first electronic device 210 may perform analysis operations related to the sender (for example, analysis of an emotion state of the sender, an intensity of emotion, age, sex, etc.). The second electronic device 220 may perform analysis operations related to the recipient (for example, analysis of a situation (event) of the recipient, a relationship with the sender, a preference of the recipient, etc.). The second electronic device 220 may determine an output pattern by combining the result of the analysis received from the first electronic device 210, and the result of the analysis thereof.

According to a certain embodiment, the analysis operations may be performed by the second electronic device 220. To achieve this, the first electronic device 210 may record the voice of the sender and captures the expression of the sender, and may transmit the voice and the expression to the second electronic device 220.

Figure 3:
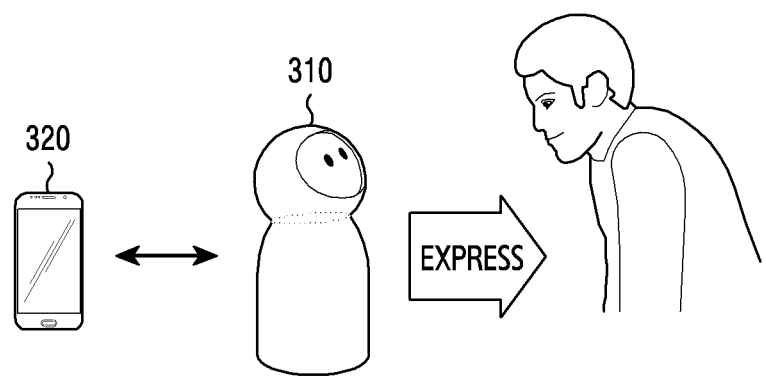
FIG. 3 is a view illustrating an example of delivering a message according to an embodiment of the disclosure.

FIG. 3 is a view illustrating an example of delivering a message according to an embodiment of the disclosure.

Referring to FIG. 3, a first electronic device 310 according to an embodiment of the disclosure may connect a communication channel with a second electronic device 320 (for example, a smartphone). The communication may include a video call, a voice call, and exchange of a text message.

When the video call is performed, the first electronic device 310 may recognize an expression of a sender by analyzing a received image (image analysis), and may analyze an emotion state and/or an intensity of emotion of the sender. In addition, the first electronic device 310 may analyze the emotion state and/or the intensity of emotion of the sender through voice analysis. Alternatively, the first electronic device 310 may convert a voice of the sender received from the second electronic device 320 into a text based on voice recognition, and may analyze the emotion state and/or the intensity of emotion through syntactic analysis of the text. Alternatively, the first electronic device 310 may analyze (recognize) the emotion state and/or the intensity of emotion of the sender by combining the results of the image analysis, the voice analysis, and the voice recognition. The first electronic device 310 may determine an output pattern based on the analyzed emotion state and/or intensity of emotion.

On the other hand, when the voice call is performed, the first electronic device 310 may perform syntactic analysis by using the voice analysis and the voice recognition, except for the image analysis, and may analyze (recognize) the emotion state and/or the intensity of emotion of the sender. Based on the analyzed emotion state and/or intensity of emotion, the first electronic device 310 may determine an output pattern. Alternatively, when a text message is received, the first electronic device 310 may perform only syntactic analysis of the received text, except for the image analysis, the voice analysis, and the voice recognition, and may analyze (recognize) the emotion state and/or intensity of emotion of the sender. Based on the analyzed emotion state and/or intensity of emotion, the first electronic device 310 may determine an output pattern.

The first electronic device 310 may deliver (express) the message to the recipient according to the determined output pattern.

Figure 4:
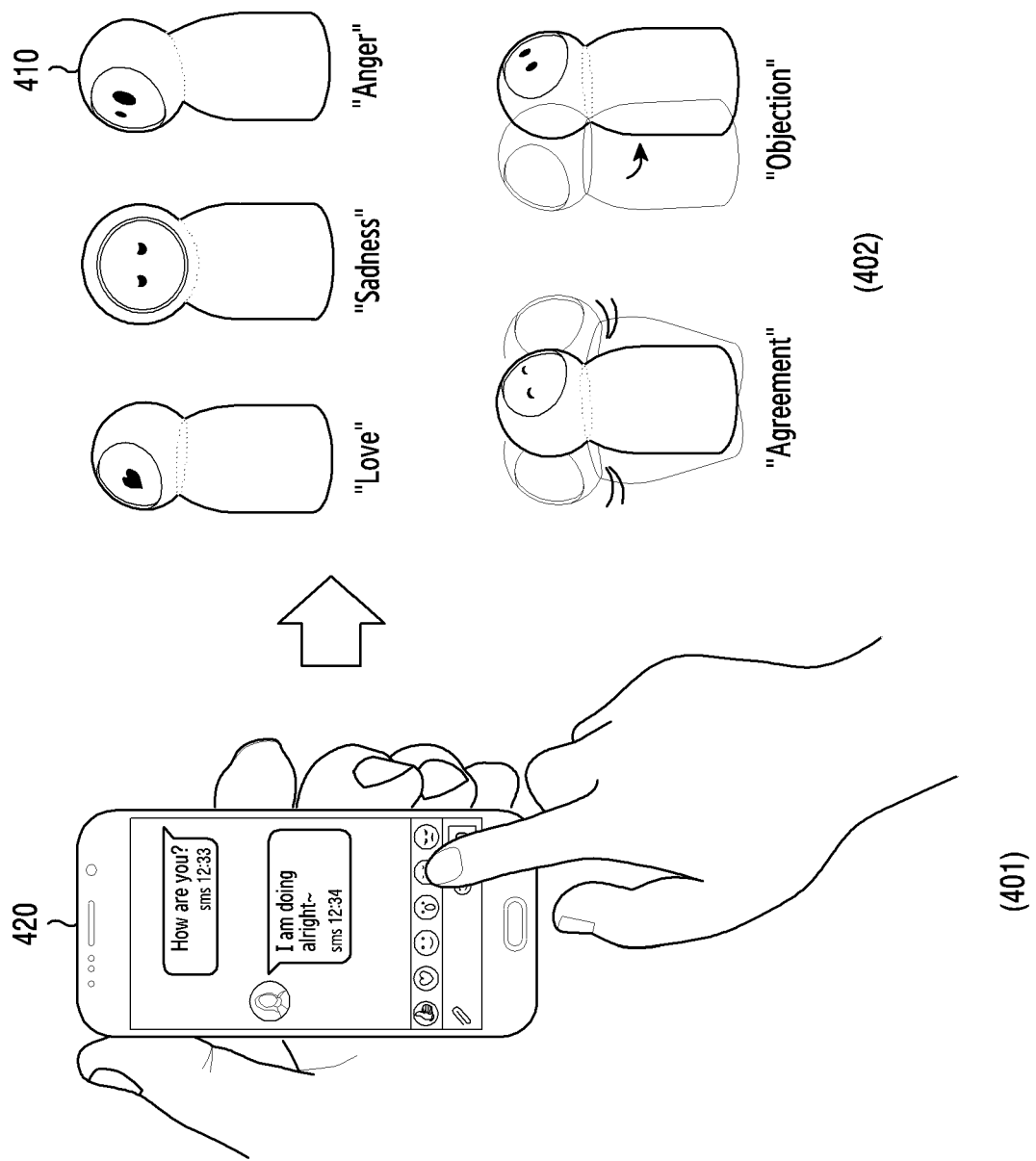
FIG. 4 is a view illustrating an example of delivering a message according to an embodiment of the disclosure.

FIG. 4 is a view illustrating an example of delivering a message according to an embodiment of the disclosure.

Referring to FIG. 4, when a first electronic device 410 according to an embodiment of the disclosure receives an emoticon from a second electronic device 420, the first electronic device 410 may recognize an emotion state corresponding to the received emoticon, and may determine an output pattern corresponding to the recognized emotion state. For example, as shown in identification number 401, the second electronic device 420 may detect selection of an emoticon and may transmit the selection to the first electronic device 410. As shown in identification number 402 of FIG. 4, the first electronic device 410 may determine an output pattern of "love," "sadness," "anger," "agreement," or "objection" according to the type of the selected emotion, and may perform an expression and/or motion according to the determined pattern.

According to a certain embodiment, the first electronic device 410 may determine an intensity of emotion through the number of emoticons. For example, when there is one smile emoticon, the first electronic device 410 may determine a smile of a first level (small smile) as the output pattern. When there are two smile emoticons, the first electronic device 410 may determine a smile of a second level (intermediate smile) as the output pattern. When there are three or more smile emoticons, the first electronic device 410 may determine a smile of a third level (big simile) as the output pattern. The number of levels may vary according to an intention of a user or a designer.

According to various embodiments of the disclosure described above with reference to FIGS. 1 to 4, a recipient may be recognized when there is a request for delivering a message, and the message may be transmitted to the recognized recipient visually, acoustically, and/or tactually, by reflecting an emotion state, an intensity of emotion, age, sex of the sender, a situation (event), and/or a preference of the recipient.

Figure 5A:
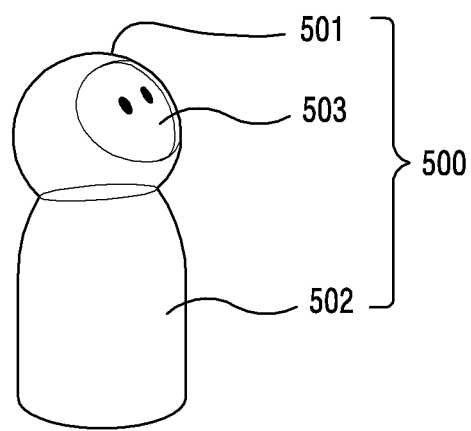
FIG. 5A is a view illustrating an electronic device according to an embodiment of the disclosure.
Figure 5B:
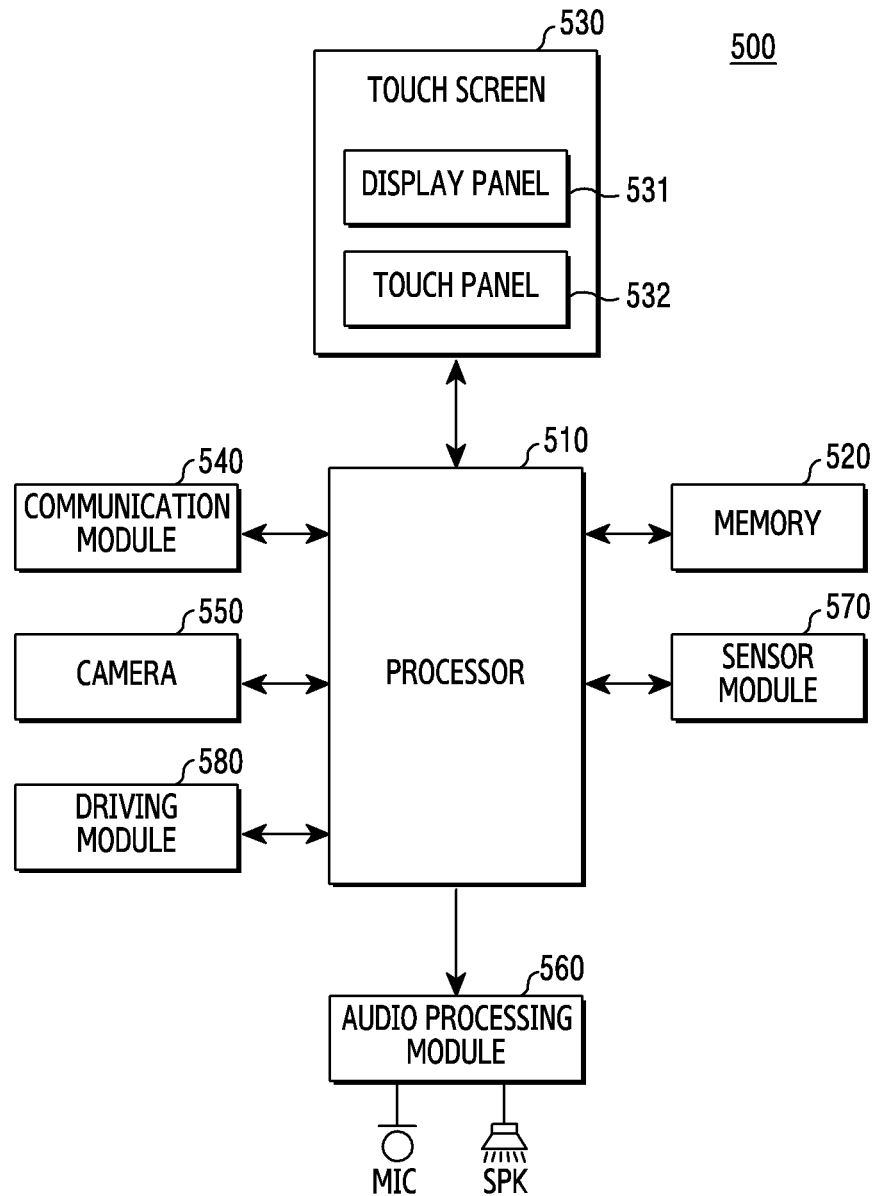
FIG. 5B is a block diagram illustrating a configuration of the electronic device according to an embodiment of the disclosure.
Figure 5C:
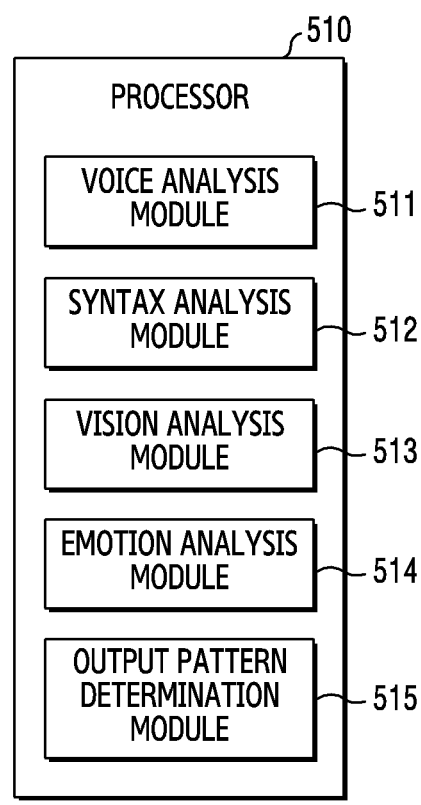
FIG. 5C is a view illustrating a configuration of a processor of FIG. 5B in detail according to an embodiment of the disclosure.

FIG. 5A is a view illustrating an electronic device according to an embodiment of the disclosure, FIG. 5B is a block diagram illustrating a configuration of the electronic device according to an embodiment of the disclosure, and FIG. 5C is a view illustrating a configuration of a processor of FIG. 5B according to an embodiment of the disclosure.

Referring to FIGS. 5A to 5C, the electronic device 500 (for example, the electronic device 100 of FIG. 1, the electronic device 210 of FIG. 2, the electronic device 310 of FIG. 3, the electronic device 410 of FIG. 4) according to an embodiment of the disclosure may have a snowman-shaped appearance. The electronic device 500 may include a first housing 501 and a second housing 502. The first housing 501 and the second housing 502 may be coupled to be rotatable vertically and/or horizontally. The first housing 501 may include a face 503. The face 503 may be formed by a display module or a touch screen. The electronic device 500 may express an emotion state and/or intensity of emotion of a sender through the face 503. For example, the electronic device 500 may visually express a sender's emotion by displaying a graphic element such as an icon, a figure, or the like on the face. The electronic device 500 may be movable. For example, the electronic device 500 may move the first housing 501 vertically like nodding, may move the first housing 501 horizontally like shaking a head, or may move forward and backward or move horizontally like a roly-poly toy. According to a certain embodiment, the electronic device 500 may include a moving means such as a wheel (not shown).

The electronic device 500 may include a processor 510, a memory 520, a touch screen 530, a communication module 540, a camera 550, an audio processing module 560, a sensor module 570, and a driving module 580.

The processor 510 may control overall operations of the electronic device 500. In other words, the processor 510 may control respective elements of the electronic device 500. For example, the processor 510 may receive instructions from the memory 520, and may control the respective elements according to the received instructions and may perform various functions.

The processor 510 may be configured by a central processing unit (CPU), an application processor (AP), a micro control unit (MCU), or the like. The processor 510 may be configured by a single core processor or a multi-core processor. In another embodiment, the processor 510 may be a multi-processor including a plurality of processors. For example, the processor 510 may include an application processor (AP) and a communication processor (CP). In another embodiment, the processor 510 may include a high-power processor (for example, an AP) and a low-power processor.

According to various embodiments, the processor 510 may control a procedure for delivering a message to a specific recipient. For example, the processor 510 may control the camera 550 to capture a sender when detecting an input of a voice message from the sender, and may analyze the captured image and the inputted message. The processor 510 may determine a recipient and an output pattern based on the result of the analysis. The processor 510 may recognize the recipient by using the camera 550, a microphone (MIC) and/or the communication module 540, and may deliver the message to the recognized recipient based on the output pattern.

As shown in FIG. 5C, the processor 510 according to an embodiment of the disclosure may include a voice analysis module 511, a syntax analysis module 512, a vision analysis module 513, an emotion analysis module 514, and an output pattern determination module 515.

The voice analysis module 511 may provide a voice recognition function for converting a voice into a text, and a speaker recognition function for identifying a speaker.

The syntax analysis module 512 may analyze a text converted through the voice recognition function, a text inputted through an input device, or a text received from another electronic device. For example, the syntax analysis module 512 may extract a phrase indicating a recipient, a phrase indicating an emotion state, and a phrase related to an event from the texts according to a predetermined rule.

The vision analysis module 513 may provide a face recognition function for recognizing a sender or a recipient, and an expression recognition function for recognizing an expression. For example, the vision analysis module 513 may recognize a user based on feature points (for example, eye, nose, mouth, etc.) of the face. The vision analysis module 513 may recognize an expression of a sender based on the outer corner of the eye, the corner of mouth, etc. The vision analysis module 513 may recognize an age band and sex of a sender by analyzing a captured image.

The emotion analysis module 514 may recognize an emotion state (for example, joy, laughing, sadness, boredom, neutral, love, surprise, interested, agreement, etc.) and/or an intensity of emotion of a sender based on the results of the voice analysis, the syntactic analysis and/or the vision analysis. When the intensities of emotions recognized through the vision analysis, the voice analysis, and the syntactic analysis are different, the emotion analysis module 514 may determine the highest intensity of emotion as the intensity of emotion of the sender.

The output pattern determination module 515 may determine the output pattern based on the various results of the analysis. For example, the output pattern determination module 515 may determine a voice type according to the age band and/or sex of the sender. The output pattern determination module 515 may determine a face expression, a motion, and/or an AUI by considering the emotion state and/or the intensity of emotion.

The output pattern determination module 515 may determine the AUI by reflecting an event related to the recipient and/or a preference of the recipient. To achieve this, the electronic device may store a plurality of output patterns in the form of a table or a database. The output patterns may be edited (for example, corrected/deleted/added) by the user.

The memory 520 may store various programs for operating the electronic device 500, and may store data generated or downloaded while the various programs are performed. In addition, the memory 520 may store various commands and/or instructions for operating the processor 510. The memory 520 may include at least one of an internal memory or an external memory.

According to various embodiments, the memory 520 may store a program for controlling a message delivering procedure. The memory 520 may store reference information for face recognition, expression recognition, speaker recognition, and syntactic analysis. For example, the memory 520 may store face characteristic information, voice characteristic information, characteristic information of various expressions (for example, a raising degree of the outer corner of the eye and/or the corner of mouth) of the sender and the recipients, specific words, etc.

The memory 520 may store an output pattern database in which results of analysis (input information) and output patterns are mapped onto each other. For example, the output pattern database may be stored as shown in <table 1> presented below:

TABLE 1

| Input information | | Output patterns | | |
|---|---|---|---|---|
| Emotion state | Intensity of emotion | Motion | Face expression | Background sound |
| Laughing | 50 or higher | 1 | A | S1 |
| | Less than 50 | 2 | B | S2 |
| Sadness | 50 or higher | 3 | C | S3 |
| | Less than 50 | 4 | D | S4 |

Referring to <table 1>, the output patterns may have different motions, face expressions and/or background sounds according to the emotion state and the intensity of emotion. Although <table 1> includes only two emotion states and two intensities of emotions, this is merely an example and does not limit the disclosure. That is, the output pattern database may include three or more emotion states and three or more intensities of emotions. In addition, although <table 1> includes only the emotion state and the intensity of emotion as input information, the output pattern database may further include a variety of input information.

For example, the input information may further include age, sex of a sender, an event related to a recipient, a preference of the recipient, etc.

The touch screen 530 may provide an input function and an output function. To achieve this, the touch screen 530 may include a touch panel 532 and a display panel 531.

The display panel 531 may provide the output function. The display panel 531 may be configured by, for example, a liquid crystal display (LCD), a light emitting diode (LED) display, an organic LED (OLED) display, or a micro-electro mechanical system (MEMS) display, or an electronic paper display.

The display panel 531 may display, for example, various contents (for example, a text, an image, a video, an icon, and/or a symbol). The display panel 531 according to various embodiments may be the face 503 of the electronic device 500. The display panel 531 may output a graphic element according to a face expression of the output pattern.

The touch panel 532 may provide the input function. For example, the touch panel 532 may detect (or recognize) a change of a physical characteristic caused by various touch inputs (for example, tap, double tap, touch, touch and drag, multi-touch, force touch, etc.) using an input tool such as a finger, a stylus, an electronic pen, etc., and may transmit the change to the processor 510. The touch panel 532 may include a first panel (not shown) for detecting a touch using a finger, a second panel (not shown) for recognizing an electronic pen, and a third panel (not shown) for detecting a force. The touch panel 532 may receive a user input for controlling the function of the electronic device 500.

The communication module 540 may perform a communication function. The communication module 540 may perform communication wiredly or wirelessly. For example, the communication module 540 may include a universal serial bus (USB) communication module, an ear jack communication module, a WiFi communication module, a Bluetooth (BT) communication module, a near field communication (NFC) module, a global positioning system (GPS) module, or the like. According to an embodiment, at least part (for example, two or more) of the WiFi communication module, the BT communication module, the NFC module, or the GPS module may be included in one integrated chip (IC) or an IC package.

According to various embodiments, the communication module 540 may connect a communication channel with an electronic device owned by a recipient (for example, the second electronic device 220 of FIG. 2) or an external electronic device (for example, the second electronic device 320 of FIG. 3, the second electronic device 420 of FIG. 4). The communication module 540 may transmit the output pattern to the electronic device owned by the recipient. Alternatively, the communication module 540 may connect a communication channel for a voice call or a video call with the external electronic device. In addition, the communication module 540 may receive a text message and/or an emoticon from the external electronic device.

The communication module 540 may transmit a captured image of a sender and an inputted message to an emotion analysis server (not shown), and may receive a result of analyzing an emotion state and/or an intensity of emotion of the sender from the emotion analysis server.

The camera 550 may capture a subject. The camera 550 may include a complementary metal oxide semiconductor (CMOS) image sensor or a charge-coupled device (CCD) image sensor. According to an embodiment of the disclosure, the camera 550 may capture a sender when there is a request for delivering a message. The camera 550 may capture a recipient. For example, the camera 550 may be activated when a subject is detected through the sensor module 570, and may capture the subject (for example, a recipient).

The audio processing module 560 may output an audio signal or receive an input of an audio signal. For example, the audio processing module 560 may output an audio signal through a speaker (SPK), and may receive an input of an audio signal through the microphone (MIC).

According to an embodiment of the disclosure, the audio processing module 560 may receive an input of a voice message of a sender through the microphone (MIC). The audio processing module 560 may output an AUI corresponding to an output pattern through the speaker (SPK) when recognizing a recipient. Alternatively, the audio processing module 560 may output the message by using a machine sound determined according to the age and sex of the sender or a preference of the recipient. According to an embodiment, the audio processing module 560 may output the message by using a voice of the sender rather than the machine sound.

The sensor module 570 may detect an approach of a subject to the electronic device 500. When detecting the approach of the subject, the processor 510 may activate the camera 550 and capture the subject, and may identify whether the subject is a recipient. In addition, the sensor module 570 may control movement of the electronic device 500. For example, the sensor module 570 may recognize a movement speed, a movement direction, an obstacle, etc. by using an acceleration sensor, a geomagnetic sensor, a gravity sensor, an infrared sensor, or the like. When the electronic device 500 is fixed, sensors of the sensor module 570 related to the control of the movement may be omitted.

The driving module 580 may control the motion of the electronic device 500. For example, the driving module 580 may drive the electronic device 500 in response to a motion of the output pattern when delivering a message to a recipient. For example, the driving module 580 may rotate the first housing 501 horizontally, or may drive the first housing 501 vertically like nodding. According to a certain embodiment, the driving module 580 may include a moving means such as a wheel, and may move the electronic device 500 to another place (for example, the vicinity of a recipient) by controlling the moving means.

The electronic device 500 may not include some of the elements described above although they are not illustrated in FIG. 5B. In another embodiment, the electronic device 500 may further include at least one other element (for example, a digital broadcasting module, a fingerprint recognition sensor, an interface module, an input device, a battery, or the like) which has an equivalent level to the above-described elements.

An electronic device according to various embodiments of the disclosure may include: a camera; at least one processor functionally connected with the camera; and a memory configured to store at least one program configured to be executable by the at least one processor, and the program may include instructions that are set to: in response to an input of a message from a sender being detected, activate the camera and to capture the sender; analyze an image of the captured sender and the inputted message; determine a recipient and an output pattern based on a result of the analysis; identify whether the recipient is recognized; and, when the recipient is recognized, deliver the message to the recognized recipient based on the determined output pattern.

According to various embodiments, the program may further include instructions that are set to track a pupil of the recipient when the recipient is recognized, and, when it is recognized that the pupil of the recipient gazes at the electronic device, to deliver the message.

According to various embodiments, the electronic device may further include a driving module configured to control driving of the electronic device, and the program may further include instructions that are set to identify a location of the recipient when the recipient is not recognized, and to control the driving module to move to the identified location of the recipient.

According to various embodiments, the program may further include instructions that are set to estimate the location of the recipient based on whether at least one other electronic device registered at a home network to which the electronic device belongs is used.

According to various embodiments, the program may further include instructions that are set to recognize the recipient by identifying the recipient through speaker recognition when a sound of a predetermined level or higher is detected through a microphone, by identifying the recipient through face recognition when a subject is detected through the camera, or, when an external electronic device is connected through short-range wireless communication, by identifying whether the external electronic device connected through the short-range wireless communication is an electronic device of the recipient.

According to various embodiments, the program may include instructions that are set to analyze at least one of recipient information, sender information, an emotion state and an intensity of emotion of the sender, an event related to the recipient, a preference of the recipient, and whether the message is required to be kept secret (secret message).

According to various embodiments, the program may further include instructions that are set to, when the message is the secrete message, identify whether there are other users in the vicinity of the recipient, and, when there are no other users, to deliver the secret message to the recipient.

According to various embodiments, the electronic device may further include a communication module, and the program may further include instructions that are set to identify whether there is an electronic device owned by the recipient, and, when there is the electronic device owned by the recipient, to control the communication module to deliver the output pattern to the electronic device owned by the recipient.

According to various embodiments, the electronic device may further include a communication module, and the program may further include instructions that are set to deliver the image of the captured sender and the inputted message to an emotion analysis server through the communication module, and to request the emotion analysis sever to analyze an emotion state and an intensity of emotion of the sender, and to receive a result of the analysis.

According to various embodiments, the output pattern may include at least one of a face expression, a motion, an AUI, and a voice type.

Figure 6:
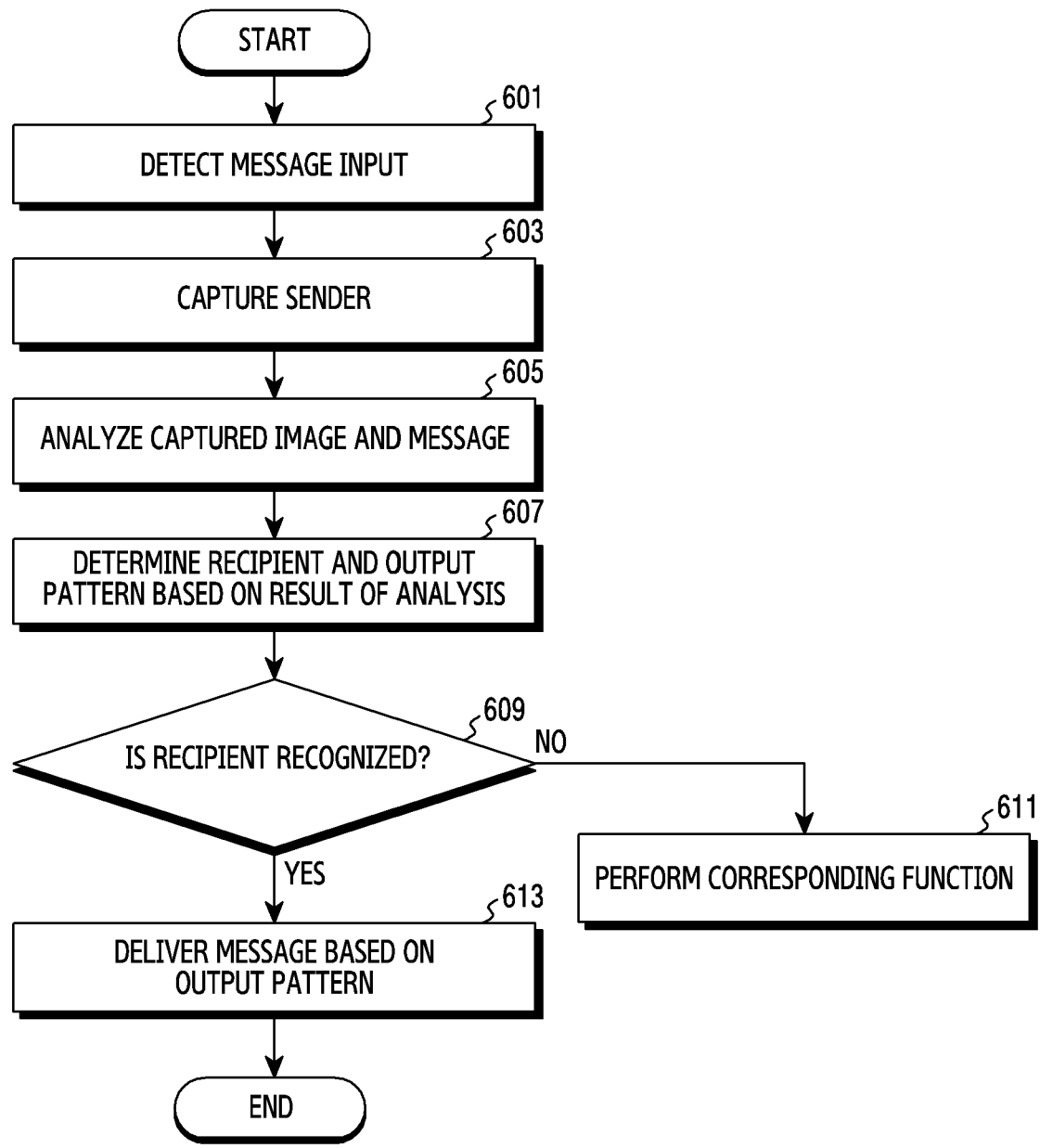
FIG. 6 is a sequence diagram to explain a method for delivering a message in an electronic device according to an embodiment of the disclosure.

FIG. 6 is a sequence diagram to explain a method for delivering a message in an electronic device according to an embodiment of the disclosure.

Referring to FIG. 6, according to an embodiment of the disclosure, in operation 601, the processor 510 of the electronic device 500 may detect a message input. The message may be a message to be delivered to a specific recipient. The message input may be inputted through a voice of a sender. However, various embodiments of the disclosure are not limited thereto. For example, the message may be inputted through various input devices (for example, a touch screen, a keyboard, or the like), or may be received from another electronic device.

In operation 603, the processor 510 may capture the sender. For example, when a voice input is detected, the processor 510 may activate the camera 550 and may capture the face of the sender. According to a certain embodiment, when the voice input of the sender is ended, the processor 510 may activate the camera 550. According to another embodiment, when a designated word (for example, snowball) is detected from the inputted voice, the processor 510 may activate the camera 550. According to still another embodiment, the electronic device 500 may activate the camera 550 in response to a set gesture input, a set menu input.

In operation 605, the processor 510 may analyze the captured image and the inputted message. For example, the processor 510 may perform user analysis, voice analysis, vision analysis, situation analysis, preference analysis, or the like. Herein, the user analysis, the voice analysis, the vision analysis, the situation analysis, and the preference analysis have been described above, and thus an explanation thereof is omitted.

In operation 607, the processor 510 may determine a recipient and an output pattern based on the results of the analysis. For example, the processor 510 may determine the output pattern including a face expression, a motion, a voice type, a sound effect (background sound), etc. by considering an emotion state and/or an intensity of emotion, age, sex of the sender, an event related to the recipient, a preference of the recipient, etc. according to the results of the analysis.

In operation 609, the processor 510 may determine whether the recipient is recognized. For example, when a person is detected through the camera 550, the processor 510 may determine whether the person is the recipient through face recognition. Alternatively, when a person's voice is detected through the microphone (MIC), the processor 510 may determine whether the person is the recipient through speaker recognition. Alternatively, when the electronic device is connected with an electronic device owned by the recipient through short range wireless communication, the processor 510 may recognize that the recipient is located in the vicinity.

When the recipient is not recognized in operation 609, the processor 510 may perform a corresponding function in operation 611. For example, the processor 510 may repeat operation 609, may receive an input of a new message, or may maintain a standby state.

According to a certain embodiment, when the recipient is not recognized, the processor 510 may identify a location of the recipient and may move to the identified location. For example, the processor 510 may request the location from at least one electronic device owned by the recipient, which has a location information reception module such as a GPS, and may receive the location. The processor 510 may control to move to locations in sequence from the location where the user is most likely to be located. For example, the processor 510 may control to move to a place where a wearable electronic device which is highly likely to be worn on the recipient is located. Alternatively, the processor 510 may identify the location of the recipient based on whether electronic devices of the recipient registered at a home network to which the electronic device 500 belongs are used. For example, the processor 510 may estimate that the recipient is located in a room of the recipient when a notebook located in the room of the recipient is being used.

On the other hand, when the recipient is recognized in operation 609, the processor 510 may proceed to operation 613 to deliver the message to the recipient based on the determined output pattern. For example, the processor 510 may deliver the message to the recipient by using a face expression, a motion, a voice type, a sound effect (background sound), etc. corresponding to the determined emotion state and/or intensity of emotion.

According to a certain embodiment, the processor 510 may track recipient's pupil after recognizing the recipient, and, when it is determined that the recipient gazes at the electronic device 500, the processor 510 may deliver the message to the recipient.

According to a certain embodiment, one embodiment of the disclosure may further include an operation such as detecting a specific voice input, detecting a gesture input, or detecting a menu input to activate the message delivering function before operation 601.

Figure 7:
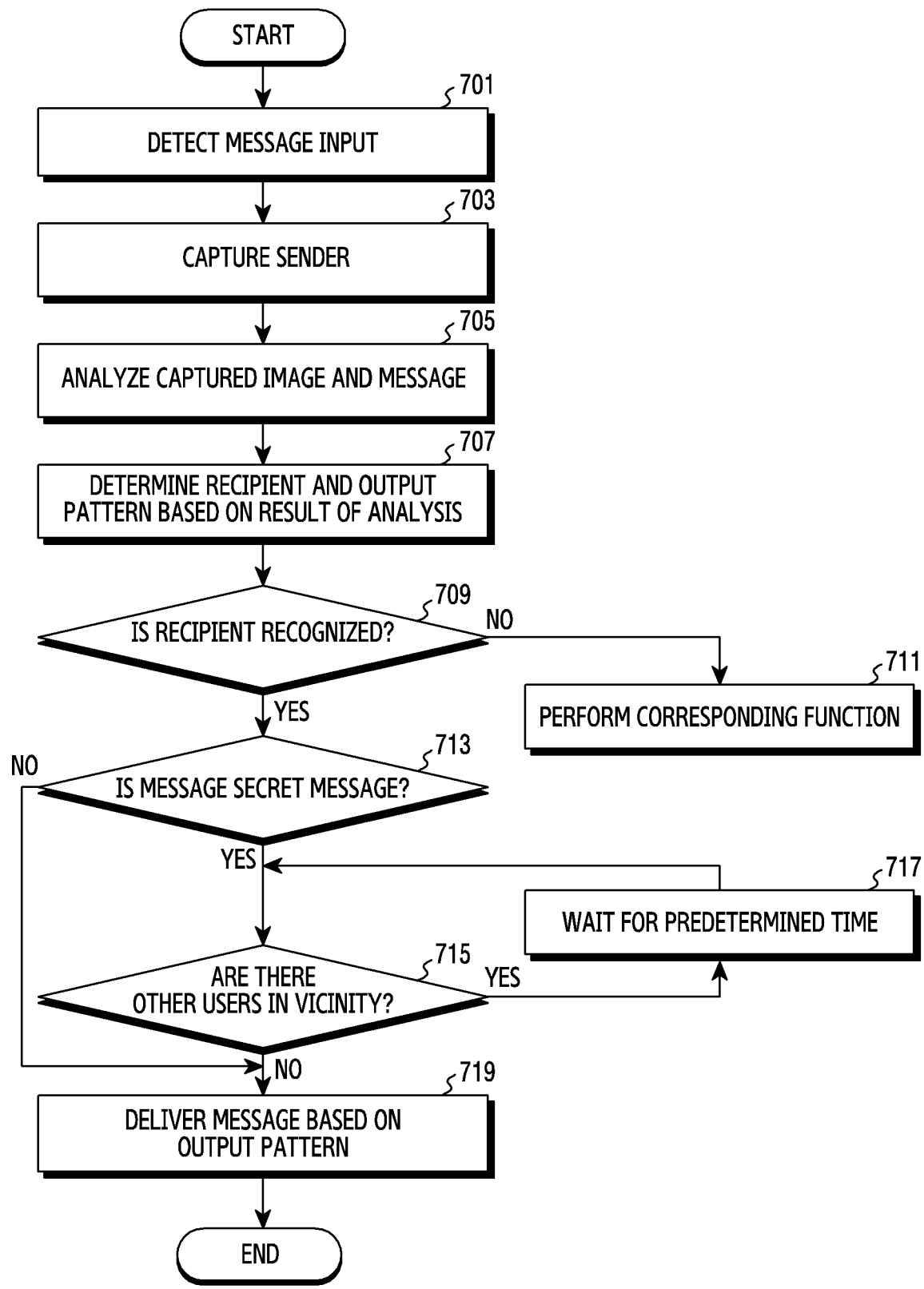
FIG. 7 is a sequence diagram to explain a method for delivering a secret message in an electronic device according to an embodiment of the disclosure.

FIG. 7 is a sequence diagram to explain a method for delivering a secret message in an electronic device according to an embodiment of the disclosure.

Referring to FIG. 7, operations 701 to 711 are similar to operations 601 to 611 of FIG. 6. A detailed description thereof is omitted.

When the recipient is recognized in operation 709, the processor 510 may proceed to operation 713 to identify whether the message is a secret message. When the message is not the secret message, the processor 510 may proceed to operation 719, which will be described below. On the other hand, when the message is the secret message, the processor 510 may proceed to operation 715 to determine whether there are other users in the vicinity. For example, the processor 510 may determine whether there are other users in addition to the recipient through the camera 550. Alternatively, the processor 510 may determine whether voices of other users are received in addition to the voice of the recipient through the microphone.

When there are other users in the vicinity, the processor 510 may proceed to operation 717 to wait for a predetermined time, and then may perform operation 715 again. On the other hand, when there are no other users in the vicinity, the processor 510 may proceed to operation 719.

In operation 719, the processor 510 may deliver the message to the recipient based on the output pattern determined previously (at operation 707).

Figure 8:
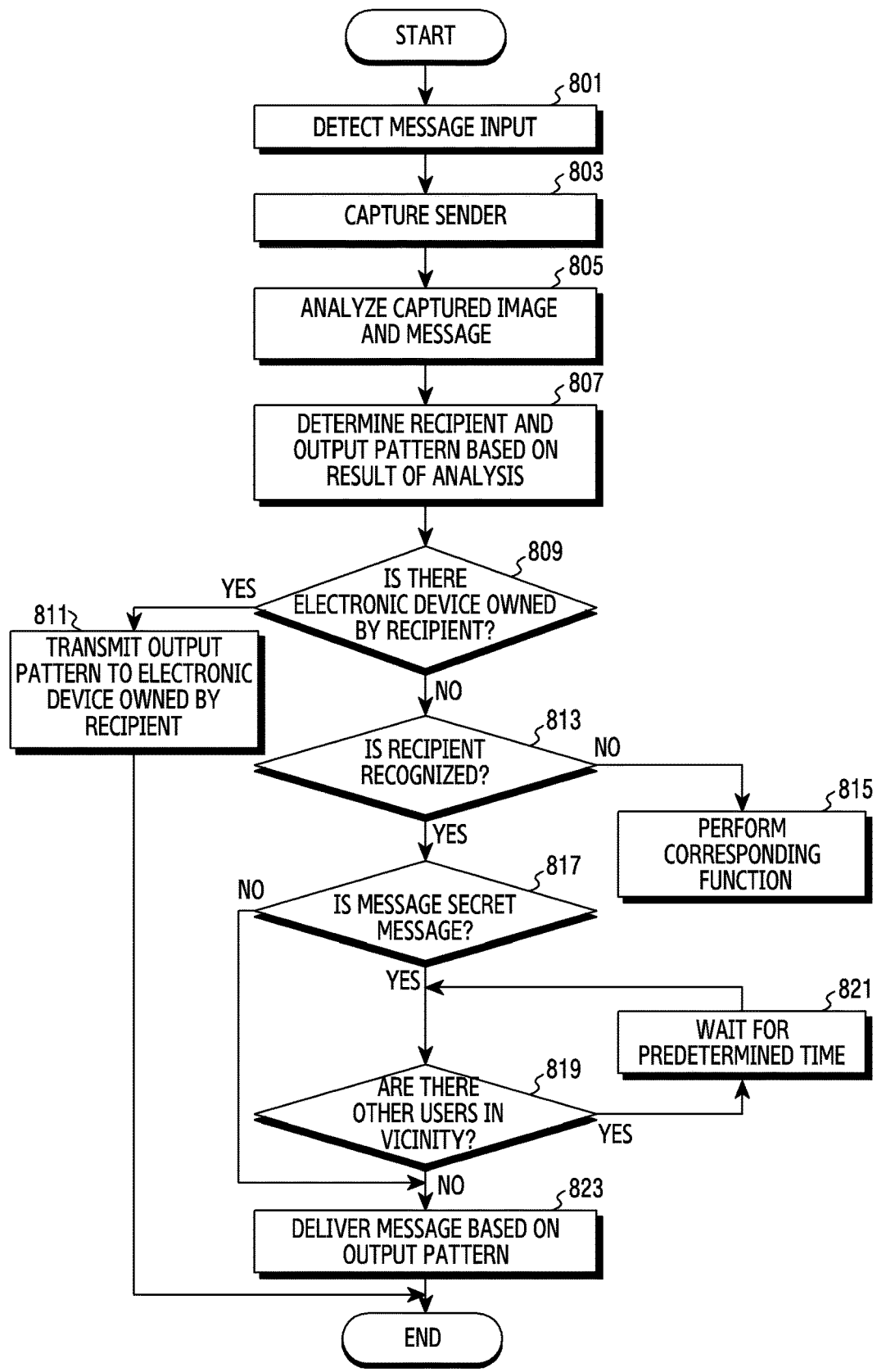
FIG. 8 is a sequence diagram to explain a method for delivering a message in an electronic device according to an embodiment of the disclosure.

FIG. 8 is a sequence diagram to explain a method for delivering a message in an electronic device according to an embodiment of the disclosure.

Referring to FIG. 8, operations 801 to 807 are similar to operations 601 to 607 of FIG. 6. A detailed description thereof is omitted.

In operation 809, the processor 510 of the electronic device 500 according to an embodiment of the disclosure may determine whether there is an electronic device owned by the recipient (for example, the second electronic device 220 of FIG. 2). When there is the electronic device owned by the recipient in operation 809, the processor 510 may proceed to operation 811.

In operation 811, the processor 510 may transmit the output pattern to the electronic device owned by the recipient, and may end the process for delivering the message.

On the other hand, when there is no electronic device owned by the recipient in operation 809, the processor 510 may proceed to operation 813. Operations 813 to 823 of FIG. 8 are similar to operations 709 to 719 of FIG. 7. A detailed description of operations 813 to 823 of FIG. 8 is omitted.

According to a certain embodiment, the analysis operations may be divided and may be performed separately by the electronic device 500 and the electronic device owned by the recipient. For example, the electronic device 500 may perform analysis operations related to the sender (for example, an emotion state, an intensity of emotion, age, sex, etc. of the sender). The electronic device owned by the recipient may perform analysis operations related to the recipient (for example, a situation (event) of the recipient, a relationship with the sender, a preference of the recipient, etc.). The electronic device owned by the recipient may determine an output pattern by combining the result of the analysis received from the electronic device 500 and the result of the analysis thereof. In this case, operation 807 may be an operation of analyzing the emotion state, intensity of emotion, age, sex, etc. of the sender, and operation 811 may be an operation of transmitting, by the electronic device 210, the result of the analysis in operation 807 and the inputted message to the electronic device owned by the recipient.

According to another embodiment, the analysis operations may be performed by the electronic device owned by the recipient. In this case, operations 805 and 807 may be operations of analyzing the message and determining the recipient, and operation 811 may be an operation of transmitting, by the electronic device 210, the inputted voice of the sender and the captured image of the sender (for example, an expression) to the electronic device owned by the recipient.

Figure 9:
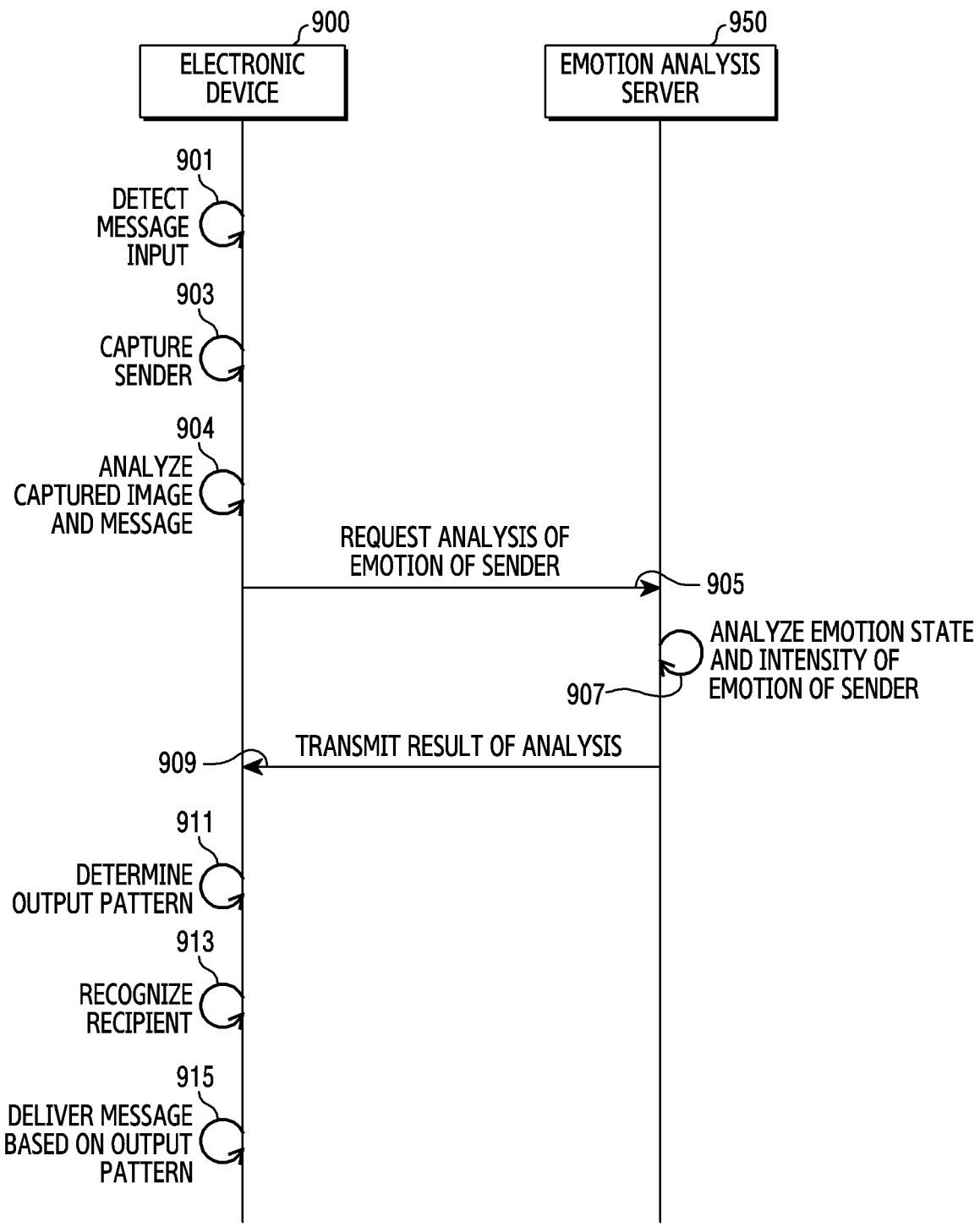
FIG. 9 is a flowchart to explain a method for delivering a message according to an embodiment of the disclosure.

FIG. 9 is a flowchart to explain a method for delivering a message according to an embodiment of the disclosure.

Referring to FIG. 9, according to an embodiment, in operation 901, an electronic device 900 may detect a message input. In operation 903, the electronic device 900 may capture a sender.

In operation 904, the electronic device 900 may analyze the captured image and the inputted message. For example, the electronic device 900 may recognize a recipient and may identify the age, sex of the sender, an event related to the recipient, a preference of the recipient, etc. by using voice analysis, vision analysis, or the like.

In operation 905, the electronic device 900 may request an emotion analysis server 950 to analyze an emotion of the sender. To achieve this, the electronic device 900 may transmit the captured image and the inputted message to the emotion analysis server 950.

In operation 907, the emotion analysis server 950 may analyze the emotion state and the intensity of emotion of the sender by performing voice analysis, vision analysis, or the like.

In operation 909, the emotion analysis server 950 may transmit the result of the analysis to the electronic device 900.

In operation 911, the electronic device 900 may determine an output pattern based on the result of analysis of the emotion of the sender received and the result of the analysis in operation 904.

In operation 913, the electronic device 900 may recognize the recipient. In operation 915, the electronic device 900 may deliver the message to the recognized recipient based on the output pattern.

According to an embodiment described above, a server end rather than the electronic device 900 analyzes the emotion of the sender based on big data. Accordingly, an embodiment of the disclosure can analyze the emotion exactly and easily.

A method for delivering a message in an electronic device according to various embodiments of the disclosure may include: in response to an input of a message from a sender being detected, capturing the sender; analyzing an image of the captured sender and the inputted message; determining a recipient and an output pattern based on a result of analyzing the image of the captured sender and the inputted message; identifying whether the recipient is recognized; and, when the recipient is recognized, delivering the message to the recognized recipient based on the determined output pattern.

According to various embodiments, recognizing the recipient may include: recognizing a face of the recipient; and tracking a pupil of the recipient and recognizing that the pupil of the recipient gazes at the electronic device.

According to various embodiments, recognizing the recipient may further include: identifying a location of the recipient; and moving to the identified location of the recipient.

According to various embodiments, identifying the location of the recipient may further include estimating the location of the recipient based on whether at least one other electronic device registered at a home network to which the electronic device belongs is used.

According to various embodiments, recognizing may include at least one of: identifying the recipient through speaker recognition when a sound of a predetermined level or higher is detected through a microphone; identifying the recipient through face recognition when a subject is detected through the camera; and, when an external electronic device is connected through short-range wireless communication, identifying whether the external electronic device connected through the short-range wireless communication is an external electronic device owned by the recipient.

According to various embodiments, analyzing may include at least one of: analyzing recipient information and sender information; analyzing at least one of an emotion state and an intensity of emotion of the sender; analyzing an event related to the recipient; analyzing a preference of the recipient; and analyzing whether the message is required to be kept secret (secret message).

According to various embodiments, analyzing at least one of the emotion state and the intensity of emotion of the sender may be performed by an emotion analysis engine in the electronic device or an emotion analysis server.

According to various embodiments, delivering the message to the recognized recipient may include: when the message is the secret message, identifying whether there are other users in the vicinity of the recipient; and, when there are no other users, delivering the secret message to the recipient.

According to various embodiments, the method may further include: identifying, by the electronic device, whether there is an electronic device owned by the recipient (recipient-owned electronic device); when there is the recipient-owned electronic device, delivering the output pattern to the recipient-owned electronic device; and delivering, by the recipient-owned electronic device, the message to the recognized recipient according to the output pattern.

According to various embodiments, determining the output pattern may be determining at least one of a face expression, a motion, a sound effect, an AUI, and a voice type.

The term "module", as used herein, may refer, for example, to a unit including hardware, software, and firmware, or any suitable combination thereof. The term "module" can be interchangeably used with terms such as "unit", "logic", "logical block", "component", "circuit", and the like. A module can be a minimum unit of an integral component or can be a part thereof. A module can be a minimum unit for performing one or more functions or may be a part thereof. A module can be mechanically or electrically implemented. For example, a module can include an Application-Specific Integrated Circuit (ASIC) chip, a Field-Programmable Gate Arrays (FPGAs), or a programmable-logic device, which are known or will be developed and which perform certain operations.

At least some parts of a device (e.g., modules or functions thereof) or a method (e.g., operations), based on embodiments of the present disclosure, can be implemented with an instruction stored in a non-transitory computer-readable storage medium (e.g., the memory 130) as a program module. When the instruction is executed by a processor (e.g., the processor 120), the processor can perform a function corresponding to the instruction.

The non-transitory computer readable recording medium can include, for example, a hard disk, a floppy disc, a magnetic medium (e.g., a magnetic tape), an optical storage medium (e.g., a Compact Disc-ROM (CD-ROM) or a DVD, a magnetic-optic medium (e.g., a floptical disc)), and an internal memory. The instruction can include code created by a compiler or code executable by an interpreter.

According to various embodiments, the non-transitory computer readable recording medium may store at least one instruction configured to cause at least one processor, when executed by the at least one processor, to perform at least one operation. The at least one operation may include: in response to an input of a message from a sender being detected, capturing the sender; analyzing an image of the captured sender and the inputted message; determining a recipient and an output pattern based on a result of analyzing the image of the captured sender and the inputted message; identifying whether the recipient is recognized; and when the recipient is recognized, delivering the message to the recognized recipient based on the determined output pattern.

The module or program module can further include at least one or more components among the aforementioned components, or can omit some of them, or can further include additional other components. Operations performed by a module, program module, or other components of the various embodiments of the present disclosure can be executed in a sequential, parallel, repetitive, or heuristic manner. In addition, some of the operations can be executed in a different order or may be omitted, or other operations may be added.

The embodiments disclosed in the present disclosure are suggested for easy explanation and understanding of the disclosed technical features, and are not intended to limit the scope of the present disclosure. Therefore, the scope of the present disclosure should be interpreted as including all changes or modified forms derived based on the technical idea of the present disclosure.

What is claimed is:

1. An electronic device comprising:
a camera;
at least one processor functionally connected with the camera;
a driving circuitry configured to control moving of the electronic device; and
a memory configured to store at least one program configured to be executable by the at least one processor,
wherein the at least one program comprises instructions that are set to:
in response to an input of a message from a sender being detected, activate the camera and capture an image of the sender,
analyze the image of the sender for extracting information related to an emotion of the sender,
analyze the inputted message for extracting information related to a recipient,
determine an output pattern based on a result of the analysis of the image of the sender,
determine the recipient based on a result of the analysis of the inputted message,
determine whether the determined recipient is located within a specified range of the electronic device,
in response to the determined recipient being located in the specified range of the electronic device, deliver the inputted message to the determined recipient based on the determined output pattern, and
in response to the determined recipient not being located in the specified range of the electronic device, identify a location of the determined recipient and control the driving circuitry to move the electronic device to the identified location of the determined recipient.

2. The electronic device of claim 1, wherein the at least one program further comprises instructions that are set to:
track a pupil of the determined recipient in response to the determined recipient being located in the specified range of the electronic device, and in response to a result of the tracking that the pupil of the determined recipient gazes at the electronic device, deliver the inputted message to the determined recipient.

3. The electronic device of claim 1, wherein the at least one program further comprises instructions that are set to estimate the location of the determined recipient based on whether at least one other electronic device registered at a home network to which the electronic device belongs is used.

4. The electronic device of claim 1, wherein the at least one program further comprises instructions that are set to determine whether the determined recipient is located in the specified range of the electronic device by identifying the determined recipient through speaker recognition in response to a sound of a predetermined level or higher being detected through a microphone, by identifying the determined recipient through face recognition in response to a subject being detected through the camera, or, in response to an external electronic device being connected through short-range wireless communication, by identifying whether the external electronic device connected through the short-range wireless communication is an electronic device of the determined recipient.

5. The electronic device of claim 1, wherein the at least one program further comprises instructions that are set to analyze at least one of sender information, and an intensity of the emotion of the sender, an event related to the determined recipient, a preference of the determined recipient, and whether the inputted message is required to be kept secret.

6. The electronic device of claim 5, wherein the at least one program further comprises instructions that are set to:
in response to the inputted message being required to be kept secret, determine whether at least one other user is located proximate to the determined recipient, and
in response to the at least one other user not being located proximate to the determined recipient, deliver the inputted message to the determined recipient.

7. The electronic device of claim 1, further comprising a communication circuitry,
wherein the at least one program further comprises instructions that are set to:

identify whether there is an electronic device owned by the determined recipient, and in response to the electronic device being owned by the determined recipient, control the communication circuitry to deliver the output pattern to the electronic device owned by the determined recipient.

8. The electronic device of claim 1, further comprising a communication circuitry, wherein the at least one program further comprises instructions that are set to:

deliver the image of the sender and the inputted message to an emotion analysis server through the communication circuitry, request the emotion analysis server to analyze the emotion of the sender and an intensity of the emotion of the sender, and receive a result of the analysis.

9. The electronic device of claim 1, wherein the output pattern comprises at least one of a face expression, a motion, an AUI, or a voice type.

10. A method for delivering a message in an electronic device, the method comprising:

in response to an input of a message from a sender being detected, capturing, using a camera of the electronic device, an image of the sender;

analyzing the image of the sender for extracting information related to an emotion of the sender;

analyzing the inputted message for extracting information related to a recipient;

determining an output pattern based on a result of analyzing the image of the sender;

determining the recipient based on a result of analyzing the inputted message;

determining whether the determined recipient is located in a specified range of the electronic device;

in response to the determined recipient being located in the specified range of the electronic device, delivering the inputted message to the determined recipient based on the determined output pattern; and in response to the determined recipient not being located in the specified range of the electronic device, identifying a location of the determined recipient, and moving, using a driving circuitry of the electronic device, the electronic device to the identified location of the determined recipient.

11. The method of claim 10, wherein the determining of whether the determined recipient is located in the specified range of the electronic device comprises at least one of:

identifying the determined recipient through speaker recognition in response to a sound of a predetermined level or higher being detected through a microphone;

identifying the determined recipient through face recognition in response to a subject being detected through the camera; or in response to an external electronic device being connected through short-range wireless communication, identifying whether the external electronic device connected through the short-range wireless communication is an external electronic device owned by the determined recipient.

12. The method of claim 10, wherein analyzing comprises at least one of:

analyzing sender information;
analyzing an intensity of the emotion of the sender;
analyzing an event related to the determined recipient;
analyzing a preference of the determined recipient; or
analyzing whether the inputted message is required to be kept secret.

13. The method of claim 12, wherein delivering the inputted message to the determined recipient comprises:

in response to the inputted message being required to be kept secret, determining whether at least one other user is located proximate to the determined recipient; and in response to the at least one other user not being located proximate to the determined recipient, delivering the inputted message to the determined recipient.

14. The method of claim 12, wherein analyzing the at least one of the emotion of the sender or the intensity of the emotion of the sender is performed by an emotion analysis engine in the electronic device or an emotion analysis server.

15. The method of claim 10, wherein the delivering of inputted message comprises:

recognizing a face of the determined recipient;
tracking a pupil of the determined recipient; and
in response to a result of the tracking that the pupil of the determined recipient gazes at the electronic device, delivering the inputted message to the determined recipient.

16. The method of claim 10, wherein identifying the location of the determined recipient comprises:

estimating the location of the determined recipient based on whether at least one other electronic device registered at a home network to which the electronic device belongs is used.

17. The method of claim 10, further comprising:

identifying, by the electronic device, whether there is an electronic device owned by the determined recipient (recipient-owned electronic device);

in response to the electronic device being recipient-owned, delivering the output pattern to the recipient-owned electronic device; and delivering, by the recipient-owned electronic device, the inputted message to the determined recipient according to the output pattern.

18. The method of claim 10, wherein determining the output pattern comprises:

determining at least one of a face expression, a motion, a sound effect, an auditory user interface (AUI), or a voice type.

19. The method of claim 17, wherein the delivering of the inputted message comprises causing a movement of the recipient-owned device to convey a gesture of the sender.

20. The method of claim 10, where the specified range of the electronic device comprises within short-range wireless communication range.

* * * * *